United States Patent [19]

Takata

[11] Patent Number: 4,700,895
[45] Date of Patent: Oct. 20, 1987

[54] HYDRAULIC METERING CONTROL

[75] Inventor: Harry H. Takata, Minneapolis, Minn.

[73] Assignee: AG-CHEM Equipment Co., Inc., Minneapolis, Minn.

[21] Appl. No.: 803,229

[22] Filed: Dec. 2, 1985

[51] Int. Cl.⁴ .......................... A01C 19/00; A01C 3/06
[52] U.S. Cl. .................................. 239/664; 239/670; 239/675; 239/677; 239/689
[58] Field of Search ............... 239/664, 670, 672, 675, 239/677, 681, 684, 687, 689, 155; 222/71, 626, 627

[56] References Cited

U.S. PATENT DOCUMENTS

| Re. 24,920 | 1/1961 | Palmer | 414/526 |
|---|---|---|---|
| 2,369,755 | 2/1945 | Rosselot | 239/664 |
| 2,684,785 | 7/1954 | Waldorf et al. | 239/675 X |
| 3,113,784 | 12/1963 | Swenson et al. | 239/657 |
| 3,344,993 | 10/1967 | Wilder et al. | 239/164 |
| 3,395,866 | 8/1968 | Sousek et al. | 239/670 |
| 3,680,741 | 8/1972 | Barber | 239/664 X |
| 3,768,737 | 10/1973 | Tobias | 239/666 |
| 3,776,431 | 12/1973 | Riley | 222/178 |
| 3,782,634 | 1/1974 | Herman | 239/156 |
| 3,853,272 | 12/1974 | Decker et al. | 239/155 |
| 3,871,587 | 3/1975 | Gail | 239/662 |
| 4,098,433 | 7/1978 | Oligschlaeger | 222/63 |
| 4,212,428 | 7/1980 | Walker | 239/677 |
| 4,232,255 | 11/1980 | Carlen | 239/155 X |
| 4,373,668 | 2/1983 | Forbes et al. | 239/74 |
| 4,523,280 | 6/1985 | Bachman | 239/74 X |

FOREIGN PATENT DOCUMENTS 2034161  6/1980  United Kingdom ............... 239/155

Primary Examiner—Andres Kashnikow
Assistant Examiner—Patrick N. Burkhart
Attorney, Agent, or Firm—Orrin M. Haugen; Thomas J. Nikolai; Frederick W. Niebuhr

[57]  ABSTRACT

An apparatus for field application of particulate solids from an elongated boom carried on a self-propelled vehicle wherein the discharge rate of the particulate solids is accomplished through the utilization of a metering control system. The metering control monitors the rotation of a delivery screw for controlled application rate with the application rate being proportional to vehicle speed, and wherein the application rate is rapidly responsive to changes in rate of speed of the vehicle. A variable capacity fluid pump is driven from the vehicle final drive shaft, with the pump supplying hydraulic fluid to a hydraulic motor providing the energy for driving the metering screw. The variable capacity pump is preferably an axial piston pump having a variably positionable swash plate.

6 Claims, 9 Drawing Figures

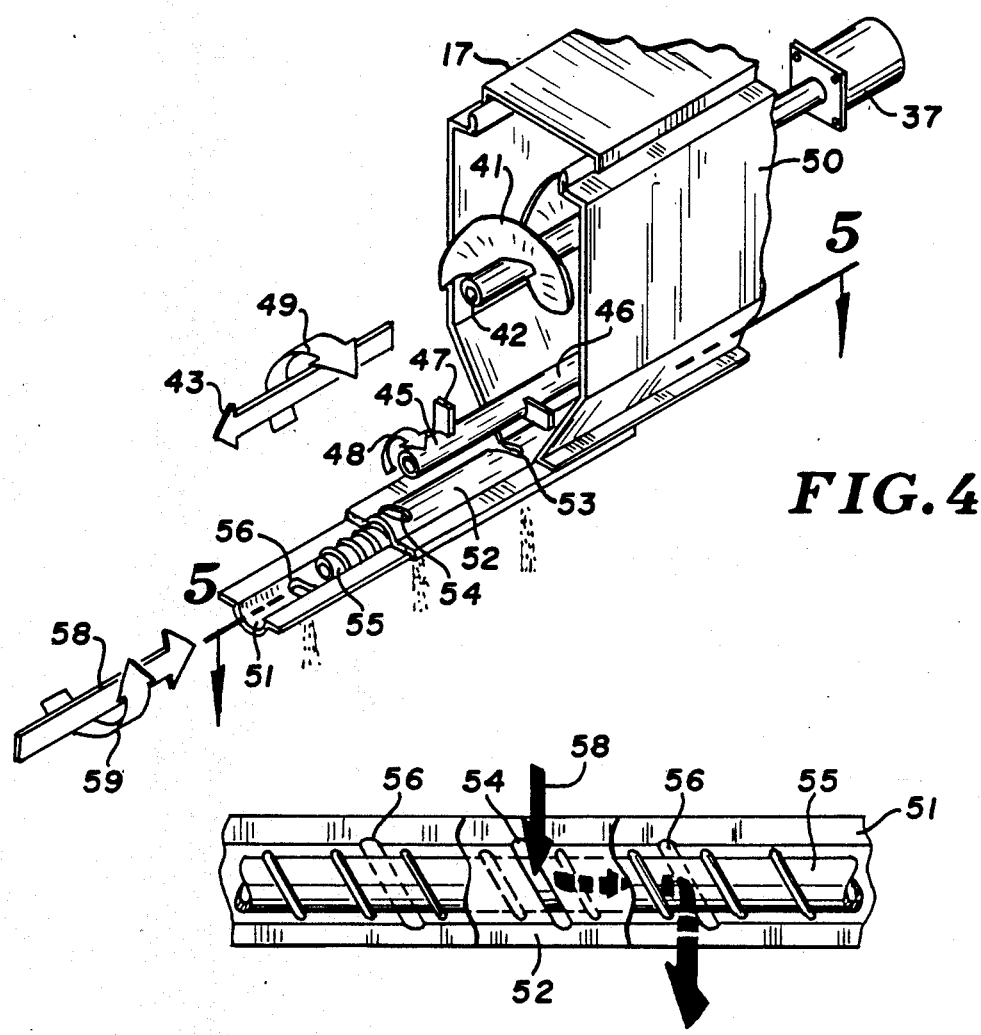
FIG. 4
FIG. 5
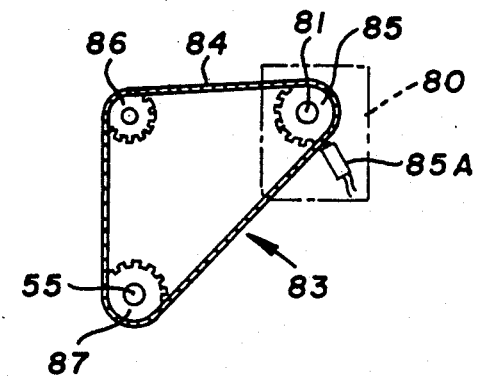
FIG. 6

HYDRAULIC METERING CONTROL

BACKGROUND OF THE INVENTION

The present invention relates generally to a control for a vehicular mounted apparatus for field application of particulate solids for soil treatment including fertilizers, herbicides, fungicides, insecticides, seeds and the like, and particularly to such an apparatus which is arranged to provide for a substantially uniform rate of application, with the materials being uniformly distributed across the entire spreading width. The improved control system is designed and constructed so as to be inherently reliable and durable, and capable of withstanding the corrosive, if not hostile, environments frequently found in dealing with the spreading of agricultural chemicals and fertilizers. The system is easily, readily, and precisely adjustable to provide a wide range of application rates (output per unit area), with these application rates being coordinated with vehicle ground speed so as to constantly maintain the pre-set application rate even in those instances when vehicle speed changes.

The control system of the present invention provides for an accurate indication of application rates, and includes both a coarse (analog) and a fine (digital) indication of the application rate. The analog indicator represents the percentage of drive pump capacity being utilized while the digital indicator is a measurement of the ratio of volumetric metering/discharge screw rotational speed to vehicle ground speed and provides the operator with an accurate indication of application rate. In addition to its accuracy, the apparatus of the present invention is relatively easy to trouble-shoot and repair in the event of the occurrence of a malfunction, and furthermore, the system is relatively easy to accurately calibrate, that is, to measure the actual output of particulate solids per unit area and re-adjust the output if necessary.

In the past, apparatus for use in the field application of particulate solids including, for example, fertilizers, seeds, and/or herbicides were designed in an attempt to provide for an appropriately, accurately and uniformly metered distribution of such materials. In these prior apparatus, attempts have been made to provide application patterns which remain consistent across the full width of spread, and over the full length of the field, regardless of the actual rate of speed or changes in rate of speed of the vehicle spreader. A commonly known device is one which interposes an externally and manually adjusted metering orifice in the output throat of conveyor moving material out of the supply hopper, and wherein this conveyor is mechanically linked to the vehicle drive. Such devices endeavor to obtain a metered and specified application density across the entire field. These past attempts have not been entirely satisfactory inasmuch as changes of rate of vehicle speed frequently involve a lag in response time required to change the application rate for materials being discharged from the application equipment, with this time lag being manifested in an oversupply or an undersupply of material downstream from the point where the speed or rate change occurred. Generally speaking, in prior known systems, alterations or changes in rate of delivery of particulate solids to the spreading or distribution system have normally been undertaken at points removed from the point of discharge, such as from the point where the vehicle supply hopper delivers material into an initial portion of a conveyor used to transport particulate solids onto a spinner spreader or into an initial portion of an elevating conveyor, then into a distributor device, and finally into pneumatic conveying tubes before discharge at various distances along a boom.

The response time lag for typical or commonly used application equipment is normally approximately two to six seconds. This time delay is normally equivalent to the period of time that the material being spread is resident in and passing through the active portions of the spreader delivery mechanism. In the past, attempts have been made to provide an electronic control and synchronization for spreader devices so as to provide remote in-cab adjustment of application rate, however the environment in which the devices are necessarily used, including a harsh mechanical environment and a hostile chemical environment renders such electronic synchronization devices generally unreliable, and not normally suited for use as a sole control device. In order to render electronic devices sufficiently reliable for use as a sole control, extensive precautions are normally required which add significantly to the cost and accordingly render such devices undesirable. Also, controls, when requiring actuation through a number of components, may contribute to a certain amount of delay. The present system, by contrast, responds immediately to changes in vehicle speed, and hence provides for uniform application rate. Also, in certain installations, for convenience and ease of articulation, a servo system may be employed to adjust the output of a positive displacement pump utilized in the drive mechanism.

A further problem has been due to mechanical damage being caused by the spreading equipment to particles of coated fertilizers, urea, and other fragile materials being spread. The present arrangement, in addition to providing accurate and uniform application rates, further provides a mechanism having operational features which minimize damage to the individual particles during movement or transfer for application to the field.

In order to overcome these control problems, the present invention provides an improved hydraulic-mechanical control system which is capable of providing uniform application of a certain specified amount of material, such as a herbicide, fertilizer, fungicide, or other agri-chemicals onto a field. The uniform application of such materials distributed evely across the entire spread width as well as along the direction of travel is not only economically desirable, but is exceptionally desirable from the standpoint of achieving enhanced production. The apparatus of the present invention achieves these goals and objectives through the use of a hydraulic-mechanical control system having both coarse (analog) and fine (digital) application rate meters, along with means for providing fine adjustment of the output and/or application rate. The arrangement of the present invention utilizes an axial piston pump with a variable and controllable output to drive the metering screw in the final output stage of the spreader, along with means for adjustment of the output. A mechanical vernier control located in the cab operates a remote control cable to adjust the output of the pump and maintain the drive speed of the metering screw at a constant ratio relative to vehicle drive speed. In the present system, drive shafts drive an axial piston pumps with variably controllable swash plates or wobble plates have been found desirable to provide a source of working fluid for the hydraulic motors used in driving the components of the metering system of the present invention.

SUMMARY OF THE INVENTION

Briefly, in accordance with the control system of the present invention, improved metering control and uniform application rates for agri-chemicals are achieved through the use of a final delivery screw or auger driven at a rate which is maintained in substantially uniform proportion to vehicle speed rate. The control system utilizes a hydraulic-mechanical control system, the control of which is always readily accessible to the vehicle operator to adjust the rate of application. The application rate is controlled by a metering screw located within the final discharge portion of the boom, and the rotational speed of the metering screw is rendered immediately responsive to changes in the rate of speed of the vehicle, so as to maximize the uniformity of application. The system of the present invention utilizes a product rate control and monitoring system based upon a variable displacement piston pump driven at a speed proportional to the vehicle speed and whose hydraulic output drives a hydraulic motor mechanically connected to a volumetric metering/discharging screw. The variable displacement pump is belt-driven through an electric clutch from the output shaft of the vehicle transmission which rotates at the same speed as the drive shaft to the drive axle. The hydraulic portion of the system is arranged in a closed-loop, with the hydraulic fluid flowing in a loop from the pump to the motor, and thence back to the inlet of the pump. The adjustment of the pump displacement provides infinitely variable ratio of the volumetric metering/discharging screw speed relative to vehicle speed. Once the pump displacement is adjusted, a speed ratio between the metering/discharge screw and vehicle speed is established and held constant. If the vehicle speeds up to traverse a greater distance and area in a given amount of time, the metering/discharge screw also speeds up discharge a proportionally large quantity of material in that larger area and the application rate per unit area remains constant. Since no mechanical readjustment is necessary during vehicle speed variations, the metering-/discharge screw speed changes instantaneously and proportionally.

The displacement of the pump is controlled by an angular adjustment of the swash plate, with the angular disposition of the swash plate determining the axial stroke of the individual pistons. Normally, the cam plate may be adjusted from zero degrees to 17 degrees so as to control the output capacity of the pump. The angular position of the swash plate is adjusted by a mechanical push-pull cable from a remote mechanical vernier control.

A monitoring system is included in the apparatus of the present invention. The monitoring system is independent from the control system, and provides the operator with information required to permit adjustment of the control and ultimate operation with both a desired and a uniform application rate. In the monitoring system, an electrical analog dial indicator is preferably provided which shows the mechanical position of the hydraulic variable displacement pump control arm, thus facilitating and providing an indication for a coarse adjustment of the system. This indicator dial is provided in order to permit the operator to pre-set the control while the vehicle is stationary. Additionally, an electronic digital display, independent from the analog indicator, is provided which shows the actual running performance of the system, and enables the operator to provide precise fine adjustment of the application rate during operation. Additionally, an audible alarm is provided and arranged to be sounded when maximum spreading speed limits are reached, in order to prevent damage to the components of the system during operation. The actual maximum vehicle speed is thereby dependent upon the control setting.

The apparatus of the present invention is normally mounted on a vehicle carrying a pair of transversely outwardly extending elongated spreader booms. The booms are utilized to apply or deliver agrichemicals in the form of particulate solids onto an application area or field being treated, with the particulate solids being supplied from a centrally disposed hopper source carried on the vehicle. A first conveyor means is provided to carry the material from the supply hopper to a receiving zone at the inboard side of the boom. Thereafter, and from the receiving zone, the materials are moved outwardly along the length of the elongated boom by a boom conveyor. The boom conveyor moves the particulate solids outwardly and is provided with spaced apart delivery sites for depositing these solids into the metering screw channel or tube for ultimate metered discharge. The hydraulic-mechanical ground speed coordination system provides instantaneous response to changes in vehicle speed, and also provides the substantially uniform application or spreading rate across the entire zone being treated. In normal operation, both booms are utilized so as to provide a full-span spread for the system. In certain instances, however, half-span spread widths are desired, whereupon the operator may utilize either the right-hand or left-hand boom individually. Such selection may be made with the apparatus of the present invention without requiring any change in the pre-set application rate mechanism.

In order to provide a convenient mathematical formula for application of pounds per acre, the following equation is deemed helpful:

Application rate = $R$ lbs./acre $$R = \frac{495\, Q}{V \times W}$$

where "Q" equals output rate lbs./minute; where "V" equals vehicle speed m.p.h.; where "W" equals spread width in feet; and 495 is a conversion unit constant. By similar analogies, application rates, such as in liquid measurement, gallons per acre, or the like, may be appropriately derived.

Therefore, it is a primary object of the present invention to provide a combined hydraulic-mechanical control system coupled with both an analog and an electronic digital monitoring or indicator system to an apparatus for application of particulate solids to an agricultural field wherein the hydraulic-mechanical control provides a substantially infinitely variable application or spread rate controllable by the vehicle operator, and wherein a hydraulic pump mechanically driven from the drive shaft of the vehicle is provided to drive the final metering screw at the delivery output portion of the spreader so that changes in vehicle speed will automatically be compensated in the rate discharge so as to maintain a uniform application rate across the entire area being treated.

It is a further object of the present invention to provide an improved apparatus for field application of particulate solids from an elongated boom structure carried upon a self-propelled vehicle, and wherein a hydraulic-mechanical drive system with ground speed coordination means are provided to deliver these solids at a uniform rate across the entire width of the elongated boom.

Still another object of the present invention is to provide an improved means for field application of particulate solids from an elongated boom carried on a self-propelled vehicle, wherein hydraulic-mechanical means are provided in the form of a metering screw driven by a hydraulic motor powered by a variable capacity pump, and wherein the control for the drive of the variable capacity pump is mechanically coordinated with the main drive system for the vehicle and is easily steplessly adjustable to a fine and predictable application rate.

It is yet a further object of the present invention to provide an improved metering arrangement for field application of particulate solids wherein an elongated boom is provided with a rotary metering screw for receiving and discharging particulate solids at a controlled rate, and wherein the application rate is proportional to and responsive to vehicle speed, the metering arrangement including a hydraulic-mechanical ground speed coordination system utilized to drive a variable capacity axial piston pump having a variably positionable swash or wobble plate, and wherein the output of the piston pump is utilized to drive a hydraulic motor for controlled rotation of the metering screw.

Other and further objects of the present invention will become apparent to those skilled in the art upon a study of the following specification, accompanying drawings, and appended claims.

IN THE DRAWINGS

FIG. 4 is a fragmentary perspective view, partially broken away, and illustrating the interior portion of the boom, and with FIG. 4 being taken generally along that segment of the apparatus shown at the arrows 4—4 of FIG. 2, with FIG. 4 being shown on a slightly enlarged scale;

FIG. 5 is a detail elevational view of a fragmentary portion of the metering screw utilized in the discharge of particulate solids from the boom structure, with FIG. 5 being taken generally along the line and in the direction of the arrows 5—5 of FIG. 4;

Figure 2:
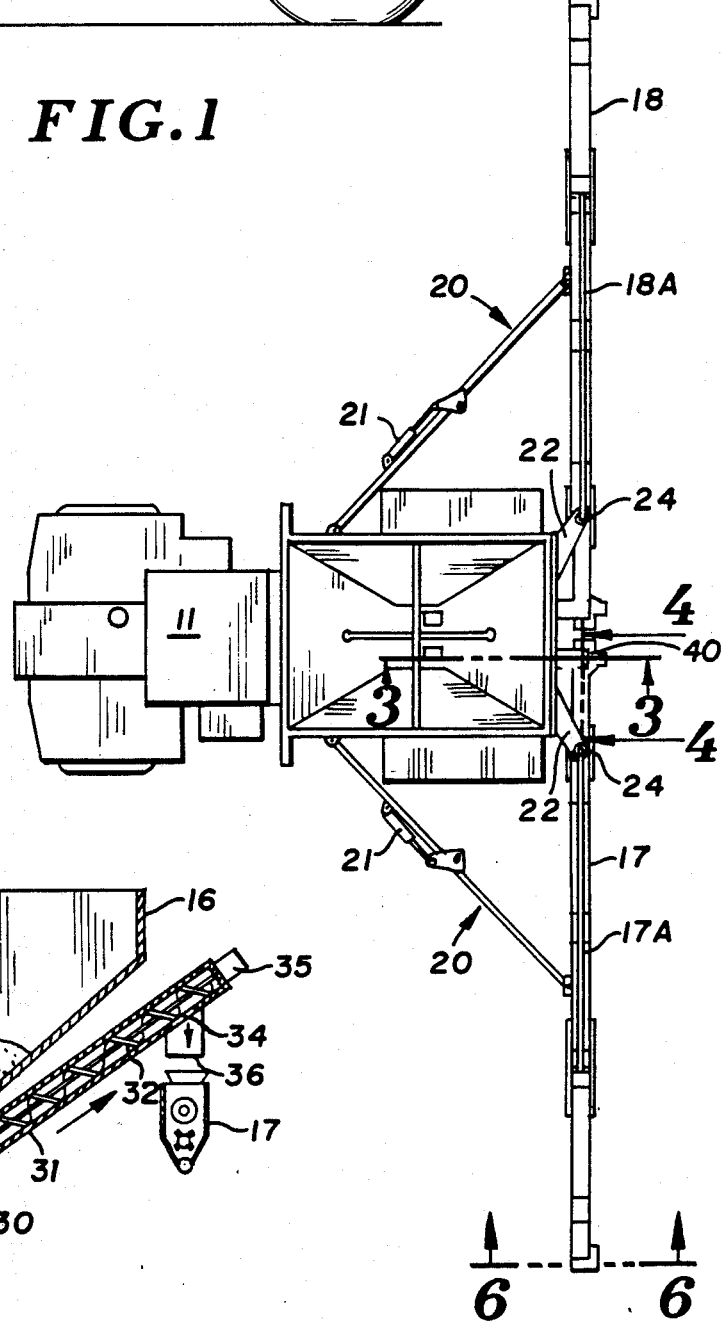
FIG. 2 is a top plan view of the self-propelled spreader vehicle arrangement shown in FIG. 1, except with the boom extended in the spreading position.
Figure 7:
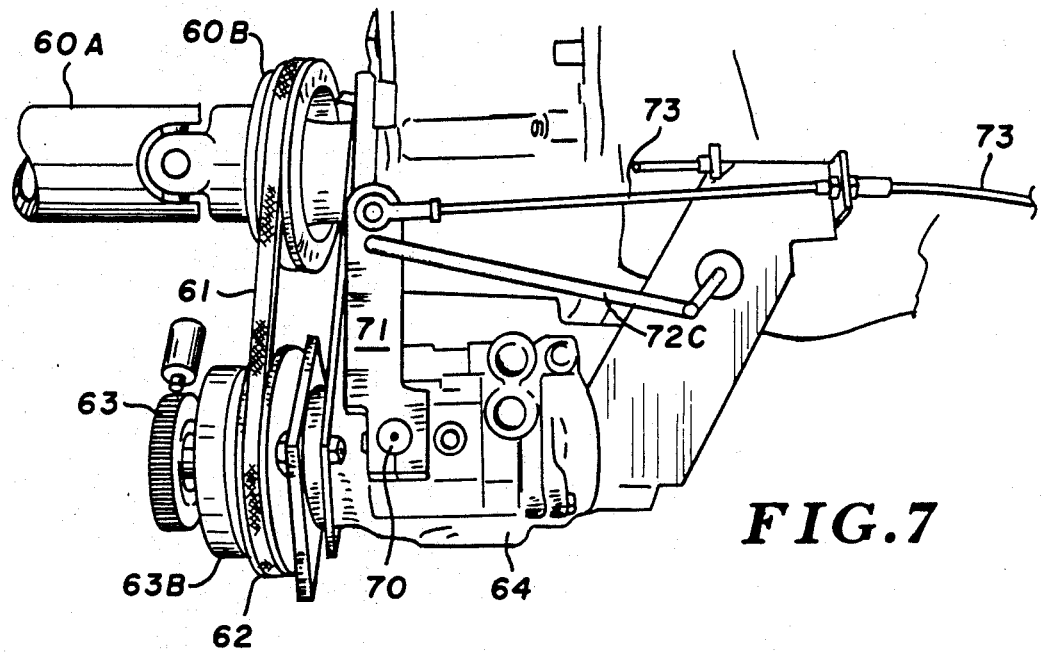
Figure 8:
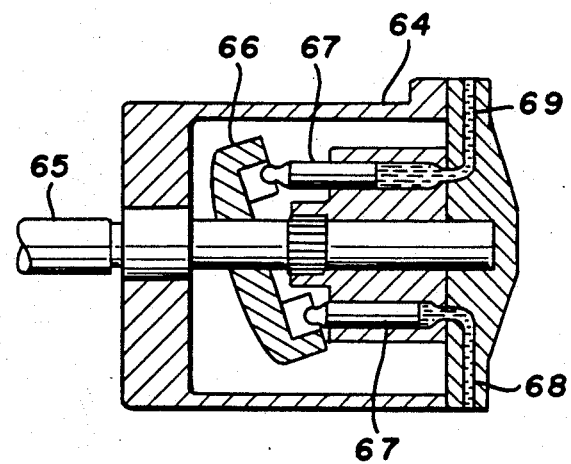
Figure 9:
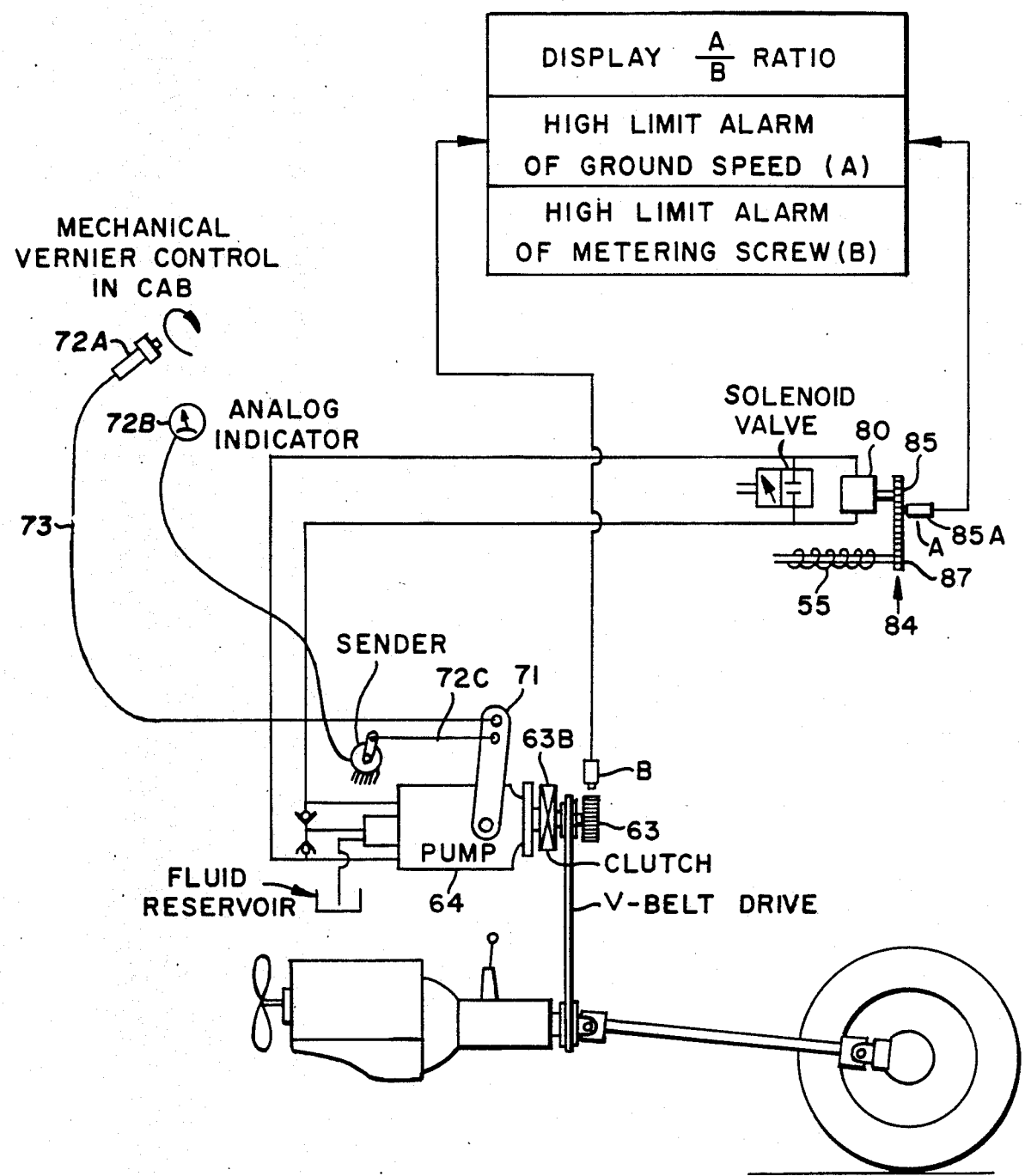

FIG. 6 is an end elevational view of the boom structure, and being shown on a slightly enlarged scale, with FIG. 6 being taken along the line and in the direction of the arrows 6—6 of FIG. 2, with FIG. 6 additionally illustrating certain of the hardware items utilized in combination with the spreader arrangement of the present invention, and including the servo actuator and dashboard control components of the present invention;

FIG. 7 is a detail perspective view illustrating one embodiment of the system as shown in FIGS. 1-6, and illustrating the manner in which the adjustment cable is attached to the pump variable displacement control arm to controllably vary the output of the hydraulic pump utilized in the system of the present invention;

FIG. 8 is a sectional view taken through the diameter of an axial piston pump, and illustrating the controllably variable disposition of the swash or wobble plate in the pump; and FIG. 9 is a simplified schematic view illustrating the hydraulic circuitry and control systems employed in the system of the present invention.

DESCRIPTION OF THE PREFERRED EMBODIMENT

Figure 1:
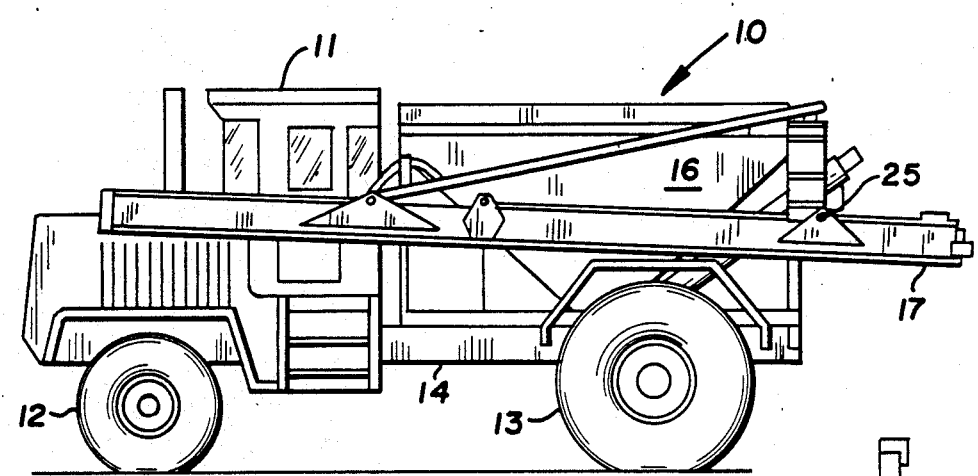
FIG. 1 is a side elevational view of a self-propelled vehicle equipped with a hopper, and arranged in the transport position, and boom with the spreader system being fabricated in accordance with the present invention.

In accordance with the preferred embodiment of the present invention, the spreader vehicle and system generally designated 10 comprises a self-propelled vehicle 11 having a conventional internal combustion engine for providing propulsion energy as well as energy for driving the spreader system, with the vehicle 11 being supported on conventional wheels as shown at 12 and 13, and with the wheeled vehicle having a conventional chassis support as at 14. The chassis support 14 is utilized to carry the spreader system shown generally at the rear of the vehicle. The spreader system includes the supply hopper 16, together with elongated booms 17 and 18, with the booms being arranged for articulated motion by means of the link systems generally designated 20, each of which is actuated by hydraulic cylinder and ram as at 21—21. Means are provided for pivotally attaching booms 17 and 18 to the vehicle chassis, such as through pivotal support brackets 22—22. As is apparent in FIG. 2, booms 17 and 18 pivot horizontally about an axis such as at 24 and vertically about an axis 25. As is conventional, the booms are arranged to be retracted to a transport position as shown in FIG. 1 when appropriate, and to an extended and level disposition while a spreading or application operation is underway as in FIG. 2. As previously indicated, in normal operaton, both booms will be operative, and arranged in extended disposition. However, in certain instances, either the right-hand boom or left-hand boom may be operated on a selective basis, with the other boom being inoperative but remaining in extended disposition. The system of the present invention accommodates operation of either boom individually, or both booms simultaneously without requiring any change in the pre-set or pre-established application rate.

Figure 3:
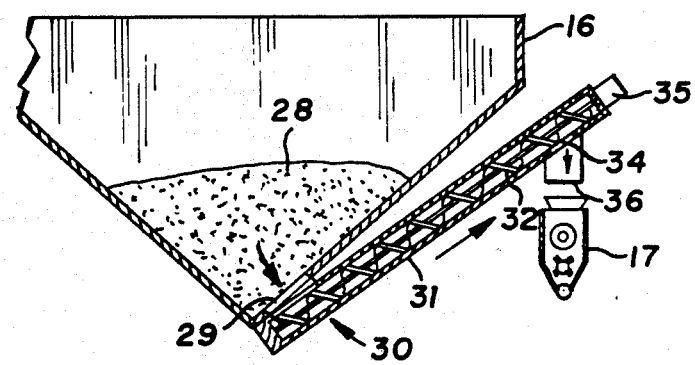
FIG. 3 is a vertical sectional view, on a slightly enlarged scale, showing the hopper and elevating auger portion of the spreader apparatus, with FIG. 3 being taken along the line and in the direction of the arrows 3—3 of FIG. 2.

Attention is now directed to FIG. 3 of the drawings wherein the hopper 16 is shown, with the hopper shown containing a partial fill of a particulate solid as at 28, and with the base of the hopper having a gate as at 29 to permit discharge of the particulate material 28 into the elevating auger assembly generally designated 30. The elevating auger includes a tubular housing 31 with an auger 32 operatively secured therein and mounted for rotation so as to convey material from the inlet port 29 to outlet port 34. Motor 35 is utilized to drive auger 32 as required. Outlet port 34 is utilized to discharge material into duct 36, and thereby drop material into the inboard end of each of the elongated booms 17 and 18. Since the arrangement of the elevating augers are identical, one to another, for each of the booms 17 and 18, only one of the elevating augers will be described in detail, it being understood that two such sub-systems are provided in a single unit.

Attention is now directed to FIG. 4 of the drawings wherein the internal construction of the boom is illustrated. It will be further understood that booms 17 and 18 are substantially identical, one to the other, the only difference being that of their mounting disposition. As indicated, the inboard end of boom 17 is provided with a receiving zone 40 for receiving a charge of particulate solids from chute of duct 36. Sensing means located at the outboard end of the booms, not shown, are employed to operate motors 35 and 37. Conventional micro-switch sensors may be provided on each boom, so as to sense when the booms are full, and thereby shut-off or otherwise disengage the conveying system. When the booms begin to empty, the sensing switch will re-start the conveying system. Such sensors are, of course, well known in the art.

With continued attention being directed to FIG. 4, the boom 17 is provided with a boom auger as at 41, with auger 41 including a central rotatable shaft 42 so as to carry material in the flow direction of arrow 43. In the arrangement of FIG. 4, arrow 43 is directed from the inboard portion toward the outboard portion. Also, agitator element 45 is provided with shaft 46 carrying agitating ears or the like as at 47. Rotation of agitator 45 occurs in the direction of arrow 48, while auger 41 is driven in a similar direction such as in accordance with the arrow 49.

Boom 17 is in the form of a pair of enclosed ducts, such as upper duct 50, and lower duct 51. Accordingly, upper duct 50 is provided with a base surface or plate at 52, with plate 52 having a number of axially spaced bores or openings formed therein as at 53 and 54. For typical operations, openings 53 and 53 will be arranged on approximately six inch centers. Agitator flutes or ears 47—47 are arranged generally directly above the openings to clear away obstructions or break down clustered particulates that would tend to clog in the opening 53.

Ducts 51 and 52 form the metering duct, and houses metering screw 55. Metering screw 55 is driven by a hydraulic motor in a manner to be described hereinbelow. The pitch of metering screw 55 may be selected so as to provide appropriate output or discharge rates. Also, as is appreciated, metering screw 55 is arranged for rotation within the confines of ducts 51 and 52. Material output ports are formed in the underside or surface of lower duct 51, such as at 56. A number of such openings are formed, normally on about six inch centers, with openings or ports 53-54 being arranged in staggered relationship with respect to openings 56—56 in lower duct 51. It will be observed that the angular disposition of the axes of the openings or ports 56—56 are disposed generally at right angles to the axes of the individual flutes of metering screw 55—55 in proximity therewith. Material moving in lower duct 51 under the influence of metering screw 55 flows in the direction of arrow 58, with metering screw 55 being rotated in a counterclockwise direction (when viewed inwardly) such as in the direction of arow 59.

Lower duct 51 is in the form of a metering housing, and as illustrated in FIG. 5, outlet ports 56—56 are disposed in staggered relationship with those ports or openings such as designated at 54.

Attention is now directed to FIGS. 6, 7 and 8 which illustrate the control and monitoring systems for the drive mechanism of the metering screw 55. Specifically, power taken from the vehicle drive shaft 60A upon which pulley 60B is mounted. Belt 61 delivers power to hydraulic pump pulley 62, with a magnetic pulse sensor and toothed indicator gear being shown at 62 (FIG. 7) and an electric clutch being shown at 63B. Hydraulic pump 64 is driven from a shaft segment fast on pulley 62, under the control of electric clutch 63B, with pump 64 being an axial piston variable displacement pump utilized in a wobble or swash plate drive as illustrated in FIG. 8. Pump 64 may be utilized as a control for two separate metering screw drive motors. When only one such drive motor is being utilized, a value-shunting system is employed so as to permit diversion of the fluid normally required for the second of a two-motor drive system. Shaft 65, as illustrated in FIG. 8, carries drive pulley 62 along with other elements. On-off control for the system is achieved by means of electric clutch 63B. Electric clutch 63B is provided for controllably and selectively energizing pump 64 through drive shaft segment 65. Wobble plate 66 is utilized to control the displacement of axial pistons such as pistons 67—67, and thereby control the output capacity of the pump through outlet channel or line as indicated at 68. Fluid is supplied to pump 64 through line and channel 69.

The disposition of swash plate 66 is controlled by internal pump plate shaft 70 and bell crank 71. Crank 71 is fast on shaft 70, and arcuate rotation or motion of crank 71 will, in turn, be reflected in the angular disposition of swash plate 66, thereby controlling and/or determining the capacity of pump 64. As indicated hereinabove, the setting of swash plate 66 is achieved by a setting within the cab such as through vernier control knob 72A (FIG. 9), and the crank 71 position is sensed by sender 72C to cab-mounted analog indicator 72B. Cable 73 is positioned as a control within the confines of the vehicle cab, always accessible to the operator for fine adjustment of the application rate, as shown in FIG. 9.

In order to inform the operator of the precise ratio of the ground speed to the metering screw speed, a digital readout meter is disposed within the vehicle cab. This digital meter is in addition to an analog indicator also disposed within the vehicle cab, and shown as at 72B in FIG. 9. For purposes of displaying the position of the analog indicator 72B, sender arm 72C, appropriately couple to the bell crank 71 is provided as indicated in FIG. 7.

The output of pump 64 is delivered to hydraulic motor 80, with the output shaft 81 of hydraulic motor 80 driving the drive system generally designated 83 (FIG. 6). Drive chain 84 is carried over drive sprocket 85, idler sprocket 86, and metering screw drive sprocket 87. Additionally, a sender unit 85A is utilized to indicate the rotational velocity of metering screw 55 by determining the rotational velocity of sprocket 85. Metering screw shaft 55 is shown attached or coupled to sprocket 87 in FIG. 6. In the arrangement illustrated, the operator utilizes the dash control 72A for fine adjustment of the output of the system while in motion and while actually applying material to the field. Adjustment of the dash control 72A actuates control cable 73 and hence the position to be assumed by bell crank 71. Crank 71 is pivotally coupled to an actuator 72 as at 71A. In operation, once the coarse selected application rate has been determined for the material involved as indicated by the analog position indicator 72B, the operator starts the spreader vehicle in motion and fine tunes or otherwise sets the dash control 72A, is response to the more precise reading displayed on digital meter in the form of the ratio of ground speed to metering screw rotation rate. In FIG. 9, this is indicated as the A/B ratio. The display indicates, as previously discussed, the ratio of the ground speed to the metering screw speed so as to permit precise application rate or delivery of the particulate material onto the field being treated.

In actual operation, the elevating conveyor inlet gates are initially closed and the hopper loaded. With the booms positioned in the extended disposition, the elevating conveyor inlet gate is opened for the selected boom or booms. The drive systems for the boom conveyor, agitator, and metering systems are then turned on or energized for the desired boom or booms 64. The pump and hydraulic motor are then energized and with the vehicle moving, the application of particulate materials commences.

If desired, initial calibration for the system and for the material being spread may be unertaken by measuring the flow rate from the boom outlets upon a test drive of the vehicle with a four-foot collection box attached beneath the lower duct 51 for a distance of 218 feet. Since 4'×218'=872 sq. ft. is equivalent to 1/50 acre, the collected weight of material in pounds×50=pounds/acre applied.

In the present system, the dash display includes two indicators providing an indication of the rate of flow, as a function of or percentage of full flow. The analog indicator 72B shows the percentage of output of the variable displacement pump by sensing the swash plate position. In this situation, the percentage output reading of analog indicator 72B is preferably set so that a reading of 50 percent, for example, indicates that the bell crank or swash plate arm 71 is rotated 50 percent of the 17 degree maximum movement. Stated another way, this indication shows that the swash plate is allowing the pistons to move one-half of their maximum stroke length, and as a result, the pump 64 produces one-half or 50 percent of its maximum capacity or discharge flow.

The digital indicator, as previously discussed, is utilized to display a ratio of metering screw speed to vehicle final drive-line speed. The digital readout is preferably arranged to correspond to the percentage of the ultimate output of the system being delivered. In other words, such an indicator is selected to display the ratio of metering screw speed and vehicle final drive speed. The digital readout accordingly will correspond to the perentage of potential output being utilized. For example, when the digital indicator displays 0.280, the percent output gauge will actually indicate 28 percent. The percent output and speed ratio indicator readings are used in determining application rates, as hereinabove set forth.

Typical application rate charts used for selecting the proper control setting is based on the material density and examples are shown in the following Table I and Table II:

TABLE I

THEORETICAL APPLICATION RATES (Lbs./Acre)
9 coils/ft. metering screw (hi rate) 40/12 Sprocket Radio

| % OUTPUT | DIGITAL RATE | BULK DENSITY (LBS./FT3.) | | | | | | | | | | | | | |
|---|---|---|---|---|---|---|---|---|---|---|---|---|---|---|---|
| | | 46 | 48 | 50 | 52 | 54 | 56 | 58 | 60 | 62 | 64 | 66 | 68 | 70 | 72 | 74 |
| 5 | 0.050 | 36 | 38 | 39 | 41 | 42 | 44 | 45 | 47 | 49 | 50 | 52 | 53 | 55 | 56 | 58 |
| | 0.060 | 43 | 45 | 47 | 49 | 50 | 52 | 54 | 56 | 58 | 60 | 62 | 63 | 65 | 67 | 69 |
| | 0.070 | 50 | 52 | 54 | 57 | 59 | 61 | 63 | 65 | 67 | 69 | 72 | 74 | 76 | 78 | 80 |
| | 0.080 | 57 | 59 | 62 | 64 | 67 | 69 | 72 | 74 | 77 | 79 | 82 | 84 | 87 | 89 | 91 |
| | 0.090 | 64 | 67 | 70 | 72 | 75 | 78 | 81 | 83 | 86 | 89 | 92 | 94 | 97 | 100 | 103 |
| 10 | 0.100 | 71 | 74 | 77 | 80 | 83 | 86 | 90 | 93 | 96 | 99 | 102 | 105 | 108 | 111 | 114 |
| | 0.110 | 77 | 80 | 84 | 87 | 90 | 94 | 97 | 100 | 104 | 107 | 110 | 114 | 117 | 120 | 124 |
| | 0.120 | 84 | 88 | 91 | 95 | 99 | 102 | 106 | 110 | 113 | 117 | 120 | 124 | 128 | 131 | 135 |
| | 0.130 | 90 | 94 | 98 | 102 | 106 | 110 | 113 | 117 | 121 | 125 | 129 | 133 | 137 | 141 | 144 |
| | 0.140 | 97 | 101 | 105 | 110 | 114 | 118 | 122 | 127 | 131 | 135 | 139 | 143 | 147 | 151 | 156 |
| 15 | 0.150 | 103 | 107 | 112 | 116 | 121 | 125 | 130 | 134 | 139 | 143 | 148 | 152 | 156 | 161 | 165 |
| | 0.160 | 109 | 114 | 118 | 123 | 128 | 133 | 137 | 142 | 147 | 152 | 156 | 161 | 166 | 170 | 175 |
| | 0.170 | 116 | 121 | 126 | 131 | 136 | 141 | 146 | 151 | 156 | 161 | 166 | 171 | 176 | 181 | 186 |
| | 0.180 | 122 | 127 | 133 | 138 | 143 | 149 | 154 | 159 | 164 | 170 | 175 | 180 | 185 | 190 | 196 |
| | 0.190 | 128 | 134 | 139 | 145 | 150 | 156 | 161 | 167 | 173 | 178 | 183 | 189 | 194 | 200 | 205 |
| 20 | 0.200 | 135 | 141 | 147 | 153 | 158 | 164 | 170 | 176 | 182 | 188 | 194 | 199 | 205 | 211 | 217 |
| | 0.210 | 141 | 147 | 153 | 159 | 166 | 172 | 178 | 184 | 190 | 196 | 202 | 208 | 214 | 220 | 226 |
| | 0.220 | 147 | 153 | 160 | 166 | 173 | 179 | 185 | 192 | 198 | 204 | 211 | 217 | 223 | 229 | 236 |
| | 0.230 | 152 | 159 | 165 | 172 | 178 | 185 | 192 | 198 | 205 | 211 | 218 | 224 | 231 | 237 | 244 |
| | 0.240 | 159 | 166 | 173 | 180 | 187 | 194 | 200 | 207 | 214 | 221 | 228 | 235 | 242 | 248 | 255 |
| 25 | 0.250 | 164 | 171 | 178 | 185 | 193 | 200 | 207 | 214 | 221 | 228 | 235 | 242 | 249 | 256 | 263 |
| | 0.260 | 170 | 177 | 185 | 192 | 200 | 207 | 214 | 222 | 229 | 236 | 244 | 251 | 258 | 265 | 273 |
| | 0.270 | 175 | 183 | 190 | 198 | 205 | 213 | 221 | 228 | 236 | 243 | 251 | 258 | 266 | 273 | 281 |
| | 0.280 | 181 | 189 | 197 | 205 | 212 | 220 | 228 | 236 | 244 | 252 | 259 | 267 | 275 | 283 | 290 |
| | 0.290 | 187 | 195 | 203 | 211 | 220 | 228 | 236 | 244 | 252 | 260 | 268 | 276 | 284 | 292 | 300 |
| 30 | 0.300 | 192 | 200 | 209 | 217 | 225 | 234 | 242 | 250 | 259 | 267 | 275 | 283 | 292 | 300 | 308 |
| | 0.310 | 198 | 207 | 215 | 224 | 232 | 241 | 250 | 258 | 267 | 275 | 284 | 292 | 301 | 309 | 318 |
| | 0.320 | 203 | 212 | 221 | 229 | 238 | 247 | 256 | 265 | 274 | 282 | 291 | 300 | 308 | 317 | 326 |
| | 0.330 | 209 | 218 | 227 | 236 | 245 | 254 | 264 | 273 | 282 | 290 | 300 | 308 | 317 | 326 | 335 |
| | 0.340 | 214 | 223 | 233 | 242 | 251 | 261 | 270 | 279 | 288 | 297 | 307 | 316 | 325 | 334 | 343 |
| 35 | 0.350 | 219 | 229 | 238 | 248 | 257 | 267 | 276 | 286 | 295 | 304 | 314 | 323 | 333 | 342 | 351 |
| 40 | 0.400 | 245 | 256 | 266 | 277 | 288 | 298 | 309 | 320 | 330 | 341 | 351 | 362 | 372 | 382 | 393 |
| 45 | 0.450 | 271 | 283 | 295 | 306 | 318 | 330 | 342 | 353 | 365 | 377 | 388 | 400 | 412 | 423 | 435 |
| 50 | 0.500 | 297 | 310 | 323 | 336 | 349 | 362 | 374 | 387 | 400 | 413 | 426 | 438 | 451 | 464 | 477 |
| 55 | 0.550 | 317 | 331 | 345 | 358 | 372 | 386 | 400 | 413 | 427 | 441 | 454 | 468 | 482 | 495 | 509 |
| 60 | 0.600 | 340 | 355 | 370 | 384 | 399 | 414 | 429 | 443 | 458 | 473 | 487 | 502 | 516 | 531 | 546 |
| 65 | 0.650 | 363 | 379 | 395 | 410 | 426 | 442 | 458 | 473 | 489 | 505 | 520 | 536 | 551 | 567 | 582 |
| 70 | 0.700 | 384 | 401 | 417 | 434 | 451 | 467 | 484 | 501 | 518 | 534 | 550 | 567 | 583 | 599 | 616 |
| 75 | 0.750 | 405 | 423 | 440 | 458 | 475 | 493 | 511 | 528 | 546 | 563 | 581 | 598 | 615 | 632 | 650 |
| 80 | 0.800 | 425 | 443 | 462 | 480 | 499 | 517 | 536 | 554 | 573 | 591 | 609 | 627 | 646 | 663 | 682 |
| 85 | 0.850 | 444 | 463 | 483 | 502 | 521 | 541 | 560 | 579 | 598 | 617 | 636 | 655 | 674 | 693 | 712 |

TABLE I-continued

THEORETICAL APPLICATION RATES (Lbs./Acre)
9 coils/ft. metering screw (hi rate) 40/12 Sprocket Radio

| % OUTPUT | DIGITAL RATE | BULK DENSITY (LBS./FT3.) | | | | | | | | | | | | | |
|---|---|---|---|---|---|---|---|---|---|---|---|---|---|---|---|
| | | 46 | 48 | 50 | 52 | 54 | 56 | 58 | 60 | 62 | 64 | 66 | 68 | 70 | 72 | 74 |
| 90 | 0.900 | 462 | 482 | 502 | 522 | 542 | 562 | 583 | 603 | 623 | 642 | 662 | 682 | 702 | 721 | 741 |
| 95 | 0.950 | 483 | 504 | 525 | 546 | 567 | 588 | 609 | 630 | 651 | 671 | 692 | 713 | 734 | 754 | 775 |
| 100 | 1.000 | 504 | 526 | 548 | 570 | 592 | 614 | 635 | 657 | 679 | 701 | 722 | 744 | 766 | 787 | 809 |

TABLE II

THEORETICAL APPLICATION RATES (Lbs./Acre)
9 coils/ft. metering screw (hi rate) 20/12 Sprocket Ratio

| % OUTPUT | DIGITAL RATE | BULK DENSITY (LBS./FT3.) | | | | | | | | | | | | | |
|---|---|---|---|---|---|---|---|---|---|---|---|---|---|---|---|
| | | 46 | 48 | 50 | 52 | 54 | 56 | 58 | 60 | 62 | 64 | 66 | 68 | 70 | 72 | 74 |
| 5 | 0.050 | 71 | 74 | 77 | 80 | 83 | 86 | 90 | 93 | 96 | 99 | 102 | 105 | 108 | 111 | 114 |
| | 0.060 | 84 | 88 | 91 | 95 | 99 | 102 | 106 | 110 | 113 | 117 | 120 | 124 | 128 | 131 | 135 |
| | 0.070 | 97 | 101 | 105 | 110 | 114 | 118 | 122 | 127 | 131 | 135 | 139 | 143 | 147 | 151 | 156 |
| | 0.080 | 106 | 111 | 115 | 120 | 124 | 129 | 134 | 138 | 143 | 147 | 152 | 156 | 161 | 165 | 170 |
| | 0.090 | 122 | 127 | 133 | 138 | 143 | 149 | 154 | 159 | 164 | 170 | 175 | 180 | 185 | 190 | 196 |
| 10 | 0.100 | 135 | 141 | 147 | 153 | 158 | 164 | 170 | 176 | 182 | 188 | 194 | 199 | 205 | 211 | 217 |
| | 0.110 | 147 | 153 | 160 | 166 | 173 | 179 | 185 | 192 | 198 | 204 | 211 | 217 | 223 | 229 | 236 |
| | 0.120 | 159 | 166 | 173 | 180 | 187 | 194 | 200 | 207 | 214 | 221 | 228 | 235 | 242 | 248 | 255 |
| | 0.130 | 170 | 177 | 185 | 192 | 200 | 207 | 214 | 222 | 229 | 236 | 244 | 251 | 258 | 265 | 273 |
| | 0.140 | 181 | 189 | 197 | 205 | 212 | 220 | 228 | 236 | 244 | 252 | 259 | 267 | 275 | 283 | 290 |
| 15 | 0.150 | 192 | 200 | 209 | 217 | 225 | 234 | 242 | 250 | 259 | 267 | 275 | 283 | 292 | 300 | 308 |
| | 0.160 | 203 | 212 | 221 | 229 | 238 | 247 | 256 | 265 | 274 | 282 | 291 | 300 | 308 | 317 | 326 |
| | 0.170 | 214 | 223 | 233 | 242 | 251 | 261 | 270 | 279 | 288 | 297 | 307 | 316 | 325 | 334 | 343 |
| | 0.180 | 224 | 234 | 243 | 253 | 263 | 273 | 282 | 292 | 302 | 311 | 321 | 331 | 340 | 350 | 359 |
| | 0.190 | 234 | 244 | 254 | 265 | 275 | 285 | 295 | 305 | 315 | 325 | 335 | 345 | 355 | 365 | 375 |
| 20 | 0.200 | 245 | 256 | 266 | 277 | 288 | 298 | 309 | 320 | 330 | 341 | 351 | 362 | 372 | 382 | 393 |
| | 0.210 | 255 | 266 | 277 | 288 | 299 | 310 | 322 | 333 | 344 | 354 | 366 | 376 | 387 | 398 | 409 |
| | 0.220 | 265 | 277 | 288 | 300 | 311 | 323 | 334 | 346 | 357 | 368 | 380 | 391 | 403 | 414 | 425 |
| | 0.230 | 275 | 287 | 299 | 311 | 323 | 335 | 347 | 359 | 371 | 382 | 394 | 406 | 418 | 429 | 441 |
| | 0.240 | 285 | 297 | 310 | 322 | 335 | 347 | 359 | 372 | 384 | 396 | 409 | 421 | 433 | 445 | 457 |
| 25 | 0.250 | 295 | 308 | 321 | 333 | 346 | 359 | 372 | 385 | 398 | 410 | 423 | 435 | 448 | 461 | 473 |
| | 0.260 | 304 | 317 | 330 | 344 | 357 | 370 | 383 | 397 | 410 | 423 | 436 | 449 | 462 | 475 | 488 |
| | 0.270 | 313 | 327 | 340 | 354 | 367 | 381 | 395 | 408 | 422 | 435 | 449 | 462 | 475 | 489 | 502 |
| | 0.280 | 323 | 337 | 351 | 365 | 379 | 393 | 407 | 421 | 435 | 449 | 463 | 477 | 491 | 504 | 518 |
| | 0.290 | 331 | 345 | 360 | 374 | 389 | 403 | 417 | 432 | 446 | 460 | 474 | 488 | 503 | 517 | 531 |
| 30 | 0.300 | 340 | 355 | 370 | 384 | 399 | 414 | 429 | 443 | 458 | 473 | 487 | 502 | 516 | 531 | 546 |
| | 0.310 | 349 | 364 | 379 | 395 | 410 | 425 | 440 | 455 | 470 | 485 | 500 | 515 | 530 | 545 | 560 |
| | 0.320 | 357 | 373 | 388 | 404 | 419 | 435 | 450 | 466 | 481 | 496 | 512 | 527 | 542 | 557 | 573 |
| | 0.330 | 365 | 381 | 397 | 413 | 428 | 444 | 460 | 476 | 492 | 507 | 523 | 539 | 554 | 570 | 586 |
| | 0.340 | 373 | 389 | 405 | 422 | 438 | 454 | 470 | 487 | 503 | 518 | 535 | 550 | 567 | 582 | 598 |
| 35 | 0.350 | 384 | 401 | 417 | 434 | 451 | 467 | 484 | 501 | 518 | 534 | 550 | 567 | 583 | 599 | 616 |
| 40 | 0.400 | 425 | 443 | 462 | 480 | 499 | 517 | 536 | 554 | 573 | 591 | 609 | 627 | 646 | 663 | 682 |
| 45 | 0.450 | 466 | 486 | 507 | 527 | 547 | 567 | 588 | 608 | 628 | 648 | 668 | 688 | 708 | 727 | 748 |
| 50 | 0.500 | 504 | 526 | 548 | 570 | 592 | 614 | 635 | 657 | 679 | 701 | 722 | 744 | 766 | 787 | 809 |
| 55 | 0.550 | 540 | 563 | 587 | 610 | 634 | 657 | 681 | 704 | 728 | 751 | 774 | 797 | 820 | 843 | 866 |
| 60 | 0.600 | 578 | 603 | 628 | 653 | 679 | 704 | 729 | 754 | 779 | 803 | 828 | 853 | 878 | 902 | 927 |
| 65 | 0.650 | 614 | 641 | 667 | 694 | 721 | 747 | 774 | 801 | 828 | 853 | 880 | 906 | 933 | 959 | 985 |
| 70 | 0.700 | 649 | 677 | 705 | 734 | 762 | 790 | 818 | 847 | 875 | 902 | 930 | 958 | 986 | 1013 | 1041 |
| 75 | 0.750 | 695 | 725 | 755 | 786 | 816 | 846 | 876 | 907 | 937 | 966 | 996 | 1026 | 1056 | 1085 | 1115 |
| 80 | 0.800 | 734 | 766 | 798 | 830 | 862 | 894 | 925 | 957 | 989 | 1020 | 1052 | 1083 | 1115 | 1146 | 1178 |
| 85 | 0.850 | 780 | 814 | 848 | 882 | 916 | 950 | 983 | 1017 | 1051 | 1084 | 1118 | 1151 | 1185 | 1218 | 1252 |
| 90 | 0.900 | 818 | 854 | 889 | 925 | 960 | 996 | 1031 | 1067 | 1103 | 1137 | 1173 | 1207 | 1242 | 1277 | 1312 |
| 95 | 0.950 | 864 | 902 | 939 | 977 | 1014 | 1052 | 1089 | 1127 | 1165 | 1201 | 1238 | 1275 | 1312 | 1349 | 1386 |
| 100 | 1.000 | 900 | 939 | 978 | 1017 | 1057 | 1096 | 1135 | 1174 | 1213 | 1251 | 1290 | 1328 | 1367 | 1405 | 1444 |

If desired, means may be provided to count the accumulated number of revolutions of metering screw 55 in order to achieve an indication of the total amount of particulate solid desposited upon the field being treated. Inasmuch as the overall spreader system is a volumetric delivery device, it is readily possible to convert the number of revolutions of the metering screw into the total weight of material dispensed.

For changing flow rate, various features of the system may be employed, such as a change in the size of drive sprocket 87 and/or a change in pitch of metering screw 55, with these adjustment features being in addition to those available from the control of output of pump 64. For level control of booms 17 and 18, leveling struts may be optionally provided as at 17A and 18A. Level dispositions of the booms assist in maintaining spreading accuracy pursuant to the metering capability of the apparatus.

What is claimed is:

1. In an apparatus for field application of particulate solids from an elongated boom carried on a wheeled vehicle including a supply hopper, first conveying means for delivering solids at a controlled rate from the supply hopper to a receiving zone at the inboard end of said elongated boom, second conveyor means for moving material from said receiving zone and along the length of said elongated boom, said apparatus being characterized in that:

(a) said elongated boom includes upper and lower generally superposed enclosed particulate solid transfer ducts, said upper duct being in communication with said receiving zone and having a boom conveyor therein for moving particulate solids from said receiving zone outwardly along said upper duct, said upper duct having a plurality of axially spaced openings formed along the base thereof and providing a communication path for particulate solids from said upper duct to said lower duct;

(b) said lower duct comprising a metering duct and having a metering screw mounted for axial rotation therewithin to move particulate solids along an axial direction inwardly of said elongated boom and counter to the direction of movement of solids in said upper duct;

(c) a plurality of openings formed in said lower duct for metered rate release of said particulate solids therefrom; and (d) drive means for rotating said metering screw at a predetermined controlled rate, said drive means including a hydraulic motor, pump means having a variable output capacity for driving said hydraulic motor, said pump means having drive means operatively coupled to a drive shaft of said vehicle for maintaining the drive rate of said pump means proportionate to the speed of said vehicle, and control means accessible to the operator for controllably adjusting the output of said pump means to said hydraulic motor so as to adjust the rate of rotation of said metering screw.

2. The apparatus as defined in claim 1 being particularly characterized in that electrically actuated clutch means are provided for said hydraulic pump drive means for controllable actuation thereof.

3. The apparatus as defined in claim 1 being particularly characterized in that gate means are provided for controlling the flow of material from said supply hopper to said receiving zone.

4. The apparatus as defined in claim 1 being particularly characterized in that said pump means is an axial pump having a variably positionable swash plate, and wherein the position of said swash plate is controlled so as to adjust and hold the ratio of metering screw speed to the vehicle speed.

5. The apparatus as defined in claim 1 being particularly characterized in that means are provided to precisely adjust the speed of said metering screw through control of the flow of hydraulic fluid from said pump to said hydraulic motor.

6. The apparatus as in claim 1 further including:

means enabling an operator to independently and selectively set said predetermined controlled rate while operating said drive means, means directly coupling said drive means to the final vehicle drive of said wheeled vehicle to establish the rate of rotation of said metering screw; and visual monitoring means for enabling said operator of said wheeled vehicle to observe the rate of output of agricultural chemicals as a function of percentage of full output thereof.

* * * * *

UNITED STATES PATENT AND TRADEMARK OFFICE
CERTIFICATE OF CORRECTION

PATENT NO. : 4,700,895
DATED : October 20, 1987
INVENTOR(S) : Harry H. Takata

It is certified that error appears in the above-identified patent and that said Letters Patent are hereby corrected as shown below:

Column 14, Line 13, "1" should read -- 4 --.

Signed and Sealed this

Second Day of February, 1988

*Attest:*

DONALD J. QUIGG

*Attesting Officer*  *Commissioner of Patents and Trademarks*